United States Patent
Young et al.

(10) Patent No.: US 9,931,943 B2
(45) Date of Patent: Apr. 3, 2018

(54) SYSTEM AND METHOD FOR BRAKE SYSTEM VERIFICATION

(71) Applicant: General Electric Company, Schenectady, NY (US)

(72) Inventors: Henry Todd Young, Erie, PA (US); Timothy Warren Brown, Erie, PA (US); Jeffrey John Wolff, Erie, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/899,643

(22) PCT Filed: Jan. 28, 2015

(86) PCT No.: PCT/US2015/013197
§ 371 (c)(1),
(2) Date: Dec. 18, 2015

(87) PCT Pub. No.: WO2015/116626
PCT Pub. Date: Aug. 6, 2015

(65) Prior Publication Data
US 2016/0325627 A1  Nov. 10, 2016

Related U.S. Application Data

(60) Provisional application No. 61/932,275, filed on Jan. 28, 2014.

(51) Int. Cl.
*B60L 7/26* (2006.01)
*B60T 13/74* (2006.01)
(Continued)

(52) U.S. Cl.
CPC ...... *B60L 7/26* (2013.01); *B60L 3/12* (2013.01); *B60L 7/28* (2013.01); *B60L 11/08* (2013.01);
(Continued)

(58) Field of Classification Search
CPC ...... B60L 7/26; B60L 3/12; B60L 7/28; B60L 11/08; B60L 15/20; B60L 15/2009;
(Continued)

(56) References Cited

U.S. PATENT DOCUMENTS 3,841,712 A   10/1974  Syria
3,858,436 A    1/1975  Hines, Jr. et al.
(Continued)

FOREIGN PATENT DOCUMENTS

| JP | 62502214 A | 8/1987 |
| JP | 2006205912 A | 8/2006 |
| JP | 2009023185 A | 2/2009 |

OTHER PUBLICATIONS

PCT Search Report and Written Opinion issued in connection with corresponding Application No. PCT/US2015/013197 dated Apr. 30, 2015.
(Continued)

*Primary Examiner* — Calvin Cheung
(74) *Attorney, Agent, or Firm* — GE Global Patent Operation; John A. Kramer

(57) ABSTRACT

A control system for a vehicle includes an electric drive system, a drive system control unit, and a friction brake system. The electric drive system is associated with a first set of wheels of the vehicle. The drive system control unit is configured to control the electric drive system to selectively provide electric motive power to the first set of wheels to propel the vehicle and electric retarding to slow the vehicle. The friction brake system includes first and second friction brake units associated with the first and second sets of wheels, respectively. The drive system control unit is further configured to determine a functionality of the second friction brake unit, for a friction brake application to the second set of wheels, independent of operation of the first friction brake
(Continued)

unit, and to control at least one vehicle system based on the determined functionality of the second friction brake unit.

18 Claims, 3 Drawing Sheets

(51) Int. Cl.
| | | |
|---|---|---|
| *B60T 13/58* | (2006.01) | |
| *B60L 3/12* | (2006.01) | |
| *B60L 7/28* | (2006.01) | |
| *B60L 11/08* | (2006.01) | |
| *B60L 15/20* | (2006.01) | |
| *B60T 17/22* | (2006.01) | |

(52) U.S. Cl.
CPC .......... *B60L 15/20* (2013.01); *B60L 15/2009* (2013.01); *B60T 13/586* (2013.01); *B60T 13/74* (2013.01); *B60T 17/221* (2013.01); *B60L 2200/36* (2013.01); *B60L 2210/30* (2013.01); *B60L 2210/40* (2013.01); *B60L 2240/423* (2013.01); *B60L 2250/10* (2013.01); *B60L 2250/16* (2013.01); *B60L 2250/26* (2013.01); *B60T 2270/40* (2013.01); *Y02T 10/645* (2013.01); *Y02T 10/70* (2013.01); *Y02T 10/7077* (2013.01); *Y02T 10/7241* (2013.01); *Y02T 10/7275* (2013.01)

(58) Field of Classification Search
CPC ............. B60L 2200/36; B60L 2210/30; B60L 2210/40; B60L 2240/423; B60L 2250/10; B60L 2250/16; B60L 2250/26; B60T 13/586; B60T 13/74; B60T 17/221; B60T 2270/40; Y02T 10/645; Y02T 10/70; Y02T 10/7077; Y02T 10/7241; Y02T 10/7275

See application file for complete search history.

(56) References Cited

U.S. PATENT DOCUMENTS

| | | |
|---|---|---|
| 4,520,663 A | 6/1985 | Moore et al. |
| 4,567,757 A | 2/1986 | Melocik et al. |
| 4,573,350 A | 3/1986 | Anderson |
| 4,610,159 A | 9/1986 | Nowak |
| 4,771,387 A | 9/1988 | Hexel et al. |
| 5,201,834 A | 4/1993 | Grazioli et al. |
| 5,315,520 A | 5/1994 | Drake et al. |
| 5,373,219 A | 12/1994 | Grabowski et al. |
| 6,206,489 B1 | 3/2001 | Schmidt et al. |
| 6,828,746 B2 | 12/2004 | Kumar |
| 6,893,058 B2 | 5/2005 | Kumar et al. |
| 7,078,877 B2 | 7/2006 | Salasoo et al. |
| 7,594,682 B2 | 9/2009 | Kumar et al. |
| 2005/0057098 A1 | 3/2005 | Bouchon |
| 2008/0100129 A1 | 5/2008 | Lubbers |
| 2009/0118887 A1 | 5/2009 | Minarcin et al. |
| 2010/0292882 A1 | 11/2010 | Murata |
| 2015/0081150 A1 | 3/2015 | Wolff et al. |

OTHER PUBLICATIONS

US Non-Final Office Action issued in connection with Related U.S. Appl. No. 12/026,976 dated Mar. 15, 2012.

Japanese Office Action issued in connection with Related JP Application No. 2009023185 dated Aug. 13, 2013.

Unofficial English Translation of Japanese Notice of Allowance issued in connection with Related JP Application No. 2009023185 dated Apr. 22, 2014.

SYSTEM AND METHOD FOR BRAKE SYSTEM VERIFICATION

CROSS-REFERENCE TO RELATED APPLICATIONS

This application is a national stage application under 35 U.S.C. §371(c) of prior filed, co-pending PCT application serial number PCT/US2015/013197, filed on Jan. 28, 2015, which claims priority to U.S. Provisional Application No. 61/932,275, titled "SYSTEM AND METHOD FOR BRAKE SYSTEM VERIFICATION" filed Jan. 28, 2014. The above-listed applications are herein incorporated by reference.

FIELD OF THE INVENTION

Embodiments of the invention relate generally to vehicle braking systems. Other embodiments relate to verifying the functionality of vehicle braking systems.

BACKGROUND OF THE INVENTION

Large off-highway vehicles ("OHVs"), such as mining vehicles used to haul heavy payloads excavated from open pit mines, are well known and typically employ motorized wheels for propelling or retarding the vehicle in an energy efficient manner. This efficiency is typically accomplished by employing a large horsepower diesel engine in conjunction with an alternator, a main traction inverter, and a pair of wheel drive assemblies housed within the rear tires of the vehicle. The diesel engine is directly associated with the alternator such that the diesel engine drives the alternator. The alternator powers the main traction inverter, which supplies electrical power having a controlled voltage and frequency to electric drive motors of the two wheel drive assemblies. Each wheel drive assembly houses a planetary gear transmission that converts the rotation of the associated drive motor energy into a high torque low speed rotational energy output which is supplied to the rear wheels.

Operating loads in an OHV may exceed one hundred tons, while the gross weight of the vehicle and load may be several hundred tons. Operating these vehicles on grade and in wet conditions, therefore, can present several challenges, especially for inexperienced operators. In addition, operating such heavy vehicles in challenging conditions necessitates that braking system operate efficiently and reliably to prevent rollbacks when starting and stopping on grade. Accordingly, it may be desirable to provide systems and methods for verifying brake system operability, which differ from existing systems and methods.

BRIEF DESCRIPTION OF THE INVENTION

In an embodiment, a control system (e.g., braking control system) for a vehicle includes an electric drive system, a drive system control unit, and a friction brake system. The electric drive system is associated with a first set of wheels (e.g., rear wheels) of the vehicle. The drive system control unit is configured to control the electric drive system to selectively provide electric motive power to the first set of wheels to propel the vehicle and electric retarding to slow the vehicle. The friction brake system includes a first friction brake unit associated with the first set of wheels and a second friction brake unit associated with a second set of wheels (e.g., front wheels) of the vehicle. The drive system control unit is further configured to determine a functionality of the second friction brake unit, for a friction brake application to the second set of wheels, independent of operation of the first friction brake unit, and to control at least one vehicle system based on the determined functionality of the second friction brake unit.

For example, the control system may be configured to determine the functionality of friction braking on the front wheels of the vehicle, independent of operation of friction braking on the rear set of wheels of the vehicle, for a blended braking operation where the electric retarding is applied to the rear wheels, friction braking is applied to the front wheels, and without friction braking of the rear wheels.

In another embodiment, a method includes controlling, with a drive system control unit, an electric drive system of a vehicle to selectively provide electric motive power to a first set of wheels of the vehicle (e.g., rear wheels) to propel the vehicle and electric retarding to slow the vehicle. The method further includes determining, with the drive system control unit, a functionality of a second friction brake unit of the vehicle, for a friction brake application to a second set of wheels of the vehicle (e.g., front wheels), independent of operation of a first friction brake unit of the vehicle. (The vehicle has a friction brake system that includes the first friction brake unit associated with the first set of wheels and the second friction brake unit associated with the second set of wheels.) The method further includes controlling at least one vehicle system based on the determined functionality of the second friction brake unit.

BRIEF DESCRIPTION OF THE DRAWINGS

Embodiments of the invention will be better understood from reading the following description of non-limiting embodiments, with reference to the attached drawings, wherein below.

DETAILED DESCRIPTION OF THE INVENTION

Figure 1:
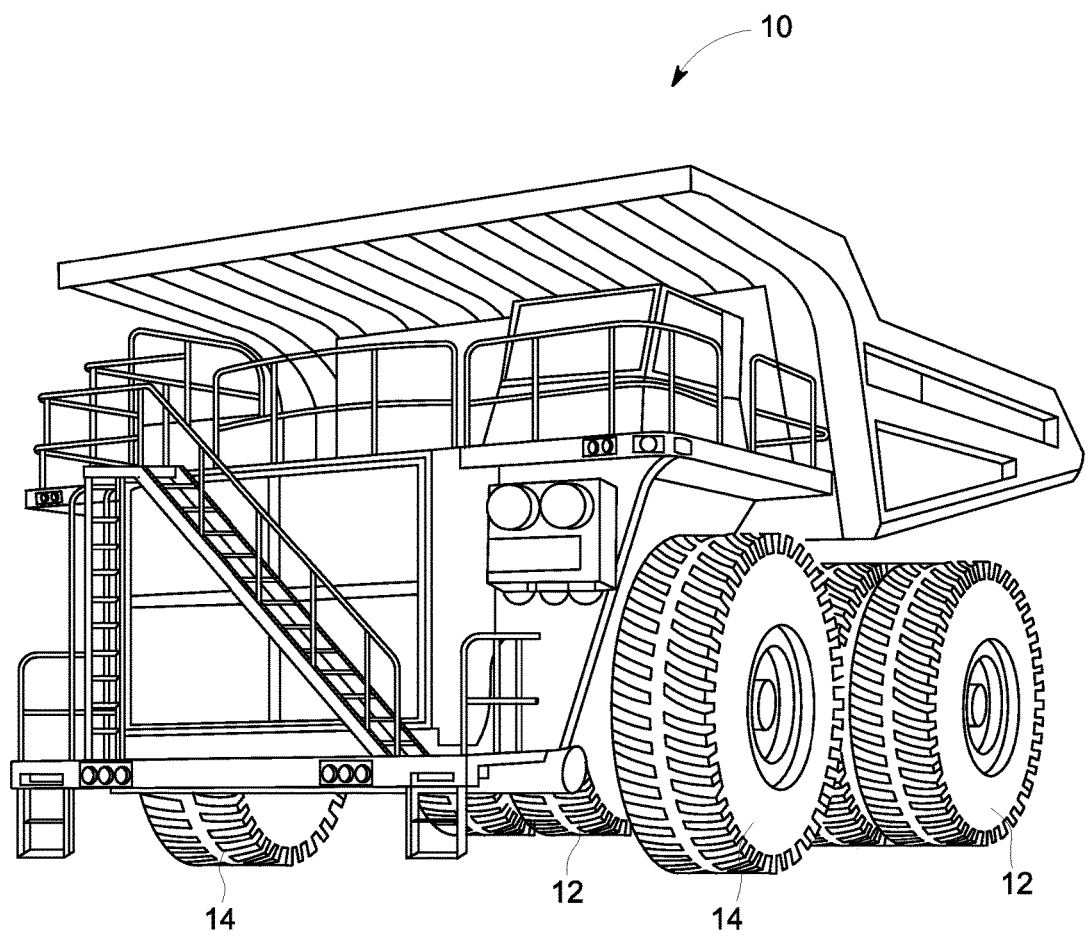
FIG. 1 is a perspective view of a vehicle according to an embodiment of the invention.

Reference will be made below in detail to exemplary embodiments of the invention, examples of which are illustrated in the accompanying drawings. Wherever possible, the same reference numerals used throughout the drawings refer to the same or like parts. Although exemplary embodiments of the present invention are described with respect to haul trucks having a diesel engine that are utilized in the surface mining industry, embodiments of the invention are also applicable for use with internal combustion engines and vehicles employing such engines, generally. For example, the vehicles may be off-highway vehicles ("OHVs") designed to perform an operation associated with a particular industry, such as mining, construction, farming, etc., and may include haul trucks, cranes, earth moving machines, mining machines, farming equipment, tractors, material handling equipment, earth moving equipment, etc. Alternatively or additionally, the vehicles may be on-road vehicles, such as tractor-trailer rigs, on-road dump trucks, etc. As used herein, "electrical communication" or "electrically coupled" means that certain components are configured to communicate with one another through direct or indirect signaling by way of direct or indirect electrical connections.

Embodiments of the invention relate to control systems and methods (e.g., braking control) for determining the functionality of the friction brakes of just one set of wheels of a vehicle (e.g., the front wheels), to verify whether (and in embodiments, to what extent) the friction brakes of those wheels will be available for a blended braking operation that combines such friction braking with electric retarding on the other set of wheels of the vehicle, e.g., rear wheels. (Generally, blended braking combines electric retarding, such as on one set of wheels, with friction braking, such as on a different set of wheels.) For example, the functionality may be determined by automatically controlling the friction brakes to apply a designated friction braking force to the front set of wheels only, applying a designated torque to the rear set of wheels (e.g., controlling wheels motors to apply the torque), and monitoring resulting vehicle movement. In one aspect, if there is no vehicle movement responsive to applying the designated torque, the front friction brakes are deemed operable for the blended braking operation.

FIG. 1 illustrates a vehicle 10 in which a control system 16 of the embodiments of the present invention may be incorporated. (The control system 16 is described below in regards to FIG. 3 and elsewhere herein.) The vehicle 10, as illustrated, is a haul truck configured for use in high-production mining and heavy-duty construction environments, and includes a first set of wheels 12, which may be rear wheels, and a second set of wheels 14, which may be front wheels. The first set of wheels 12 may be drive wheels that are coupled to an electric drive system 100 (see FIG. 2) which provides motive power to the haul truck 10. The second set of wheels 14 may be operably coupled to a vehicle steering system for vehicle steering. (The haul truck 10 is illustrative of vehicles generally, although in embodiments, a system and/or method of the embodiments of the invention is implemented on a haul truck specifically.)

Figure 2:
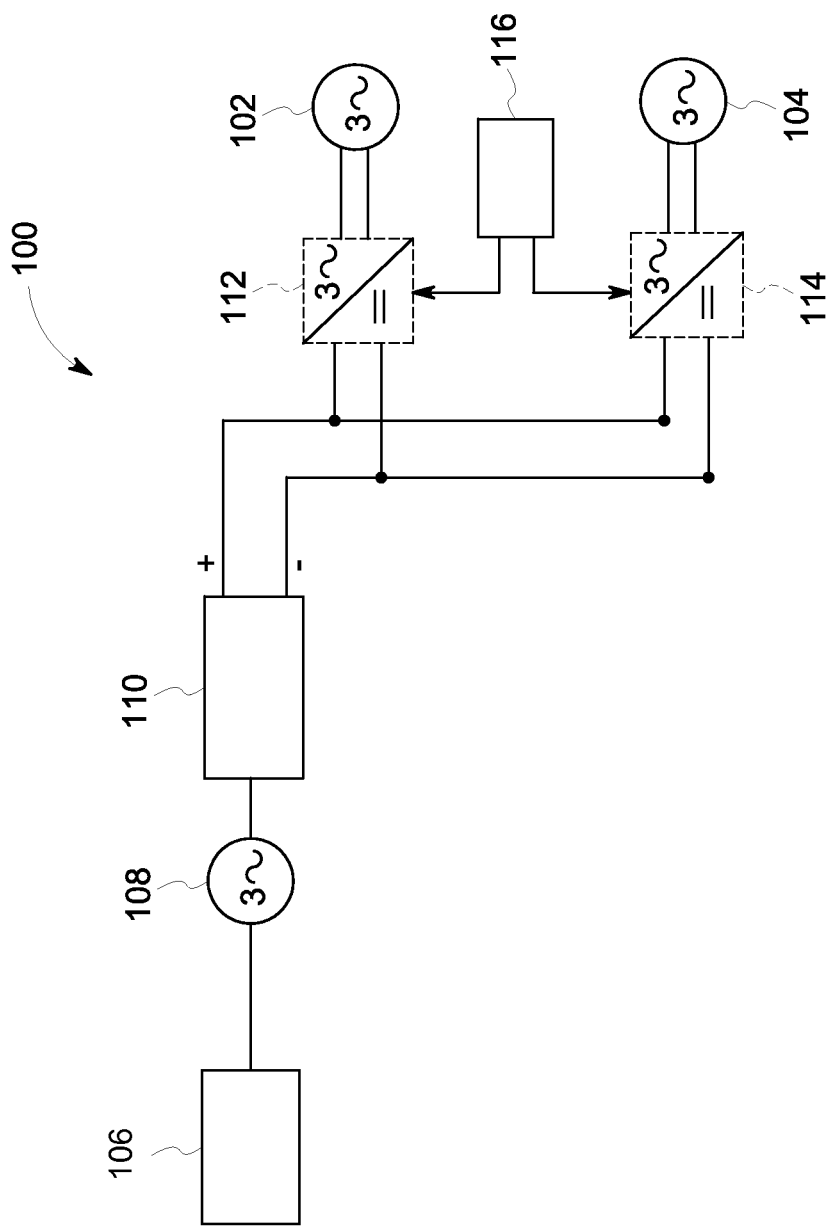
FIG. 2 is a schematic diagram of an electric drive system, according to an embodiment.

An embodiment of the electric drive system 100 is shown in FIG. 2. The electric drive system 100 is at least partially housed within the vehicle 10, and comprises a three-phase alternating current (AC) generator/alternator 108 that is coupled to be mechanically driven by an engine 106 (e.g., a diesel engine). An AC output of the generator 108 is fed into one or more rectifiers 110, which are configured to convert the AC output of the generator/alternator 108 to a direct current (DC) output. The DC output of the rectifiers 110 is supplied to a DC bus, which (among other loads) feeds into a set of inverters 112, 114. The inverters 112, 114 are configured to convert DC power from the DC bus into controlled three-phase, variable frequency AC power. Outputs of the inverters 112, 114 are electrically connected to electric motors 102, 104 (respectively), and the AC power output by the inverters 112, 114 has a waveform suitable for driving the electric motors 102, 104. The electric motors 102, 104 are operably coupled to the drive wheels 12 of the first set of wheels. For example, the motors 102, 104 may be three-phase, AC induction wheel motors. If the second set of wheels 14 are drive wheels, then the electric drive system 100 would include additional inverters and electric motors coupled similarly to the inverters 112, 114 and motors 102, 104 in FIG. 2.

As further shown in FIG. 2, a drive system control unit 116 is electrically coupled to the electric drive system 100. For example, the drive system control unit may be connected to the inverters 112, 114. The drive system control unit 116, among other tasks, is configured to determine and send a desired torque request signal to the inverters 112, 114. The torque request signal is processed by the control unit for the inverters 112, 114 to drive the motors 102, 104 to the desired torque output magnitude, and in the desired rotational direction corresponding to the intended direction of vehicle movement. The control unit is also configured to control the motors 102, 104 to provide retarding tractive effort to the wheels 12 (e.g., rear wheels) to slow or stop the vehicle 10. In particular, when operating in an electric braking mode, also known as electric retarding, the electric motors 102, 104 are reversed to act as generators, and the drive wheels 12 of the vehicle 10 drive the electric motors 102, 104. Driving the motors 102, 104 places a torque on the drive wheels 12 and causes them to slow, thus braking the vehicle. In an embodiment, the control unit 116 includes one or more microprocessors operating according to a set of stored instructions to provide for vehicle control, as discussed in detail below and elsewhere herein.

Figure 3:
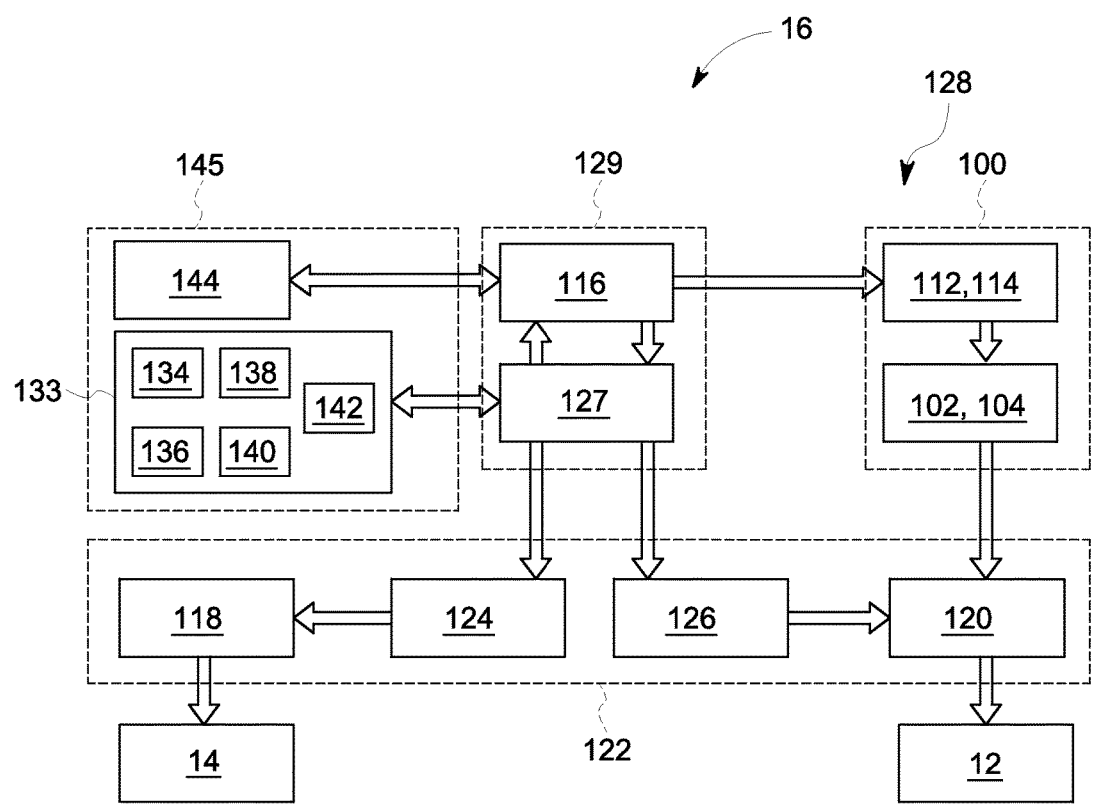
FIG. 3 is a schematic diagram illustrating a control system, according to an embodiment.

FIG. 3 shows an embodiment of the control system (e.g., braking control system) 16 in more detail. The control system 16 comprises a friction brake system 122 that includes a first (e.g., rear) friction brake unit 120 (e.g., friction brake actuation unit) associated with the first set of wheels 12 (e.g., rear wheels) of the vehicle and a second (e.g., front) friction brake unit 118 (e.g., friction brake actuation unit) associated with the second set of wheels 14 (e.g., front wheels) of the vehicle. In an embodiment, the friction brake system 116 is a hydraulic brake system, which further includes a first (e.g., rear) brake solenoid valve 126 that is controllable to control the pressure of hydraulic fluid to the first friction brake unit 120, and a second (e.g., front) brake solenoid valve 124 that is controllable to control the pressure of hydraulic fluid to the second friction brake unit 118. In other embodiments, other means for actuating the first and second friction brake units 120, 118 may also be utilized without departing from the broader aspects of the present invention. In either (or any) embodiment, each friction brake unit may include, for example, respective components for controllably applying a friction load to a moving part associated with a wheel 12, 14, e.g., brake pads operably coupled with a vehicle axle or brake disc/rotor, hydraulically-actuated calipers for applying a force to the brake pads against the disc/rotor, and so on. The control system 16 further includes a friction brake control unit 127 that is configured to control application of the first and second (e.g., rear and front) friction brake units 120, 118 at least partially in response to operator inputs, such as the depression of a brake pedal.

In an embodiment, the drive system control unit 116 and friction brake control unit 127 are electrically coupled to one another and may be generally referred to as one or more controllers 129. While the drive system control unit 116 and friction brake control unit 127 are illustrated as separate components in FIG. 3, the control units 116, 127 may be integrated into a single control unit/controller/processor.

As further shown in FIG. 3, the drive system control unit 116 is electrically coupled to the drive-train 128 of the vehicle 10, which includes the electric drive system 100, e.g., engine 106, generator 108, rectifier 110, inverters 112, 114, and drive motors 102, 104 (AC induction wheel motors as shown in FIG. 2, or otherwise). When braking the vehicle 10 in an electric retarder braking mode, the control unit 116 commands the electric drive system 100 (acting in effect as an electric retarding system that includes the inverters 112, 114, and motors 102, 104) to provide a requested desired vehicle retarding torque to the wheels.

As also shown in FIG. 3, one or both of drive system control unit 116 and/or the friction brake control unit 127 may be configured to receive inputs from an operator control 133, e.g., an ignition switch 134, an accelerator position transducer 136, a brake pedal position transducer 138, and/or a gear selector 140, for operating the electric motors 102, 104 for driving and braking the vehicle 10. The ignition switch 134 is operable to turn the vehicle on and off. The accelerator position transducer 136 is configured to detect a position of an accelerator pedal or other actuator. The brake pedal position transducer 138 is configured to detect a position of a brake pedal or other actuator. The gear selector 140 provides a means for permitting an operator to select an intended or desired direction of vehicle movement, such as forward movement or reverse movement. In addition or alternatively, the operator control may comprise another type of input interface 142, e.g., steering wheel or other steering controls, touchscreen or other computer interface, control input from a control system or autonomous controller, and so on. As further shown in FIG. 3, a display 144 may be electrically coupled to the drive system control unit 116 to allow an operator of the vehicle 10 to view status information relating to various vehicle systems. The display 144 and operator control(s) 133 collectively form an I/O (input/output) system 145.

With further reference to FIG. 3, in an embodiment, the control system 16 is configured to automate the operation of the vehicle when starting and stopping, while loaded, on grade. In operation, when an operator of the vehicle (the operator may be a person or an autonomous controller) requests that the vehicle come to a stop, or that the vehicle move in a certain direction (e.g., in either case through actuation of an operator control), the drive system control unit 116 communicates with the friction brake control unit 127 to control a transition from friction brakes to electrical effort/propulsion, and vice versa. In particular, the control system 16 includes an interface between the drive system control unit 116 and the friction brake control unit 127 that allows the drive system control unit 116 (e.g., in response to feedback or other information from the electric drive system 100) to request a specific braking effort from the friction brake control unit 127. This interface also allows the drive system control unit 116 to request from the friction brake control unit 127 that friction braking effort be added or removed (i.e., increased or decreased). Thus, in embodiments, the drive system control unit 116 is configured to communicate with the friction brake control unit 127 to control an amount of a friction brake application during vehicle stops and starts. For example, the drive system control unit 116 may be configured to communicate with the friction brake control unit to at least partially automatically control the amount of the friction brake application during vehicle stops and starts on an inclined grade on which the vehicle is positioned. (At least partial automatic control means fully automatic control, or automatic control responsive to, and based in part on, an operator input, e.g., a degree or rate of braking or acceleration that is responsive and proportional to a degree of change in position of a brake pedal or accelerator pedal.)

In connection with the above, the drive system control unit 116 may be configured to utilize system parameters to calculate the force needed to hold the vehicle 10 on the given inclined grade. The drive system control unit 116 then determines when to request the friction brakes be released or more friction braking effort be added in dependence upon this determined force. The force may be determined based on various methods as outlined in the aforementioned U.S. patent application Ser. No. 14/464,226, filed Aug. 20, 2014. Alternatively or additionally, the system 16 may be configured for the force to be determined based on information of the inclined grade as generated by an on-board inertial measurement unit, information on vehicle mass (e.g., determined from a weighing station, or from on-board, physics-based calculations from sensor data relating to vehicle acceleration under known conditions), other vehicle/system parameters (e.g., vehicle wheel radius), etc.

In embodiments, the control system 16 is also configured to provide anti-rollback capabilities. In particular, the drive system control unit 116 is configured to determine a torque level needed to move the vehicle from stop to up an inclined grade (i.e., the vehicle is stopped while on the inclined grade, and is then controlled to move up the inclined grade). The torque level may be determined based on the force, e.g., the torque level would be a level that at least just exceeds the force. Upon calculating the torque required (or at some point subsequent to calculating the torque), the drive system control unit 116 communicates with the friction brake control unit 127 to request removal of a friction brake application (i.e., amount of friction brake application=zero) to commence motion of the vehicle in the desired direction, without substantial rollback. Thus, in embodiments, the drive system control unit 116 is further configured, responsive to an input from an operator control (for the vehicle to move up down the inclined grade), to communicate with the friction brake control unit 127 to remove the friction brake application and concurrently control the electric drive system 100 to provide the electric motive power according to the torque level that is determined, for the vehicle to move from stop to up (or down) the inclined grade without substantial vehicle rollback. The drive system control unit 116 may be configured to communicate with the electric drive system and the friction brake control unit so that an amount and rate at which the friction brake application is removed (by the friction brake control unit controlling the friction brake system) is automatically controlled to be proportional or equivalent to an amount and rate at which additional torque is provided (by the electric drive system as controlled by the drive system control unit). For example, as the friction brake application is reduced by a particular amount, the torque is concurrently increased by an amount at least sufficient to offset the lowered friction brake application to prevent vehicle rollback until the friction brake application is completely removed, at which time additional torque is generated for the vehicle for move forward. (Without "substantial" vehicle rollback includes no vehicle rollback, and vehicle rollback below a threshold that is deemed to still meet designated safety guidelines, e.g., rollback of no more than 0.3 meters for certain haul truck applications.)

In other embodiments, the control system 16 is alternatively or additionally configured to provide controlled stop capabilities, such as when a vehicle 10 is operating on grade. In particular, the drive system control unit 116 is configured to calculate the force needed to hold the vehicle 10 on the given inclined grade, and, responsive to an input from an operator control for the vehicle to come to a stop while moving on the grade, to communicate with the friction brake control unit 127 to increase the amount of friction brake application, in dependence at least in part upon the force that is determined, to bring the vehicle to a stop and hold the vehicle stopped on the grade. The drive system control unit 116 may be further configured to calculate the force needed to bring the vehicle to a stop in the first place, and to simultaneously communicate with the friction braking control unit 127 to request an amount (and rate) of friction brake application to stop and then hold the vehicle the inclined grade. Generally, such calculations may take into account vehicle mass, current rate/velocity of travel, degree of grade incline, etc. For example, the braking force required to bring a vehicle to a stop while traveling up a grade would depend on vehicle mass and rate of deceleration (change in velocity from current velocity to zero over a given distance) less a factor due to rolling friction/resistance less a factor due to the force of gravity on the grade. The braking force then required to then hold the vehicle stopped on the grade would depend on vehicle mass, the grade, etc. as discussed above.

In embodiments, application of the friction brake system to bring a vehicle to a stop and hold the vehicle stopped on an inclined grade is concurrent with a reduction in electric retarding. Here, the drive system control unit 116 is configured to calculate the force needed to hold the vehicle 10 on the given inclined grade, and, concurrently with a reduction in the electric retarding, to communicate with the friction brake control unit to increase the amount of friction brake application, in dependence at least in part upon the force that is determined, to bring the vehicle to a stop and hold the vehicle stopped on the grade. Thus, as the vehicle is moving up an inclined grade, the drive system control unit 116, responsive to an input from an operator control for the vehicle to come to a stop, may be configured to first initiate electric retarding, and as the retarding effort by the electric drive system is reduced as the vehicle slows, concurrently communicate with the friction brake control unit to increase the amount of friction brake application. After the vehicle comes to a complete stop, the amount of electric retarding may be zero, and in such a case the amount of friction brake application will be sufficient to hold the vehicle stopped on the inclined grade. The drive system control unit 116 may be configured to automatically control the amount and rate by which the friction brake application increases concurrently with the decrease in electric retarding such that (i) an overall deceleration profile (change in velocity over time from a current non-zero velocity to zero velocity) of the vehicle is linear (and thereby smooth-seeming to human operators) and (ii) proportional in terms of rate to one or more inputs from an operator control, e.g., the drive system control unit would control the decrease in electric retarding and concurrent increase in friction braking to provide faster deceleration responsive to an input from an operator control for a higher degree/rate of braking versus an input from the operator control for a lower degree/rate of braking.

In embodiments, the control system is configured both for controlled stopping of a vehicle on an inclined grade, and anti-rollback as the vehicle is controlled to move forward (e.g., up the grade) from its stopped position. Here, the drive system control unit, responsive to a first input from an operator control for the vehicle to come to a stop while moving on the grade, is configured to determine the force (to hold the vehicle stopped on the grade), and (e.g., concurrently with a reduction in electric retarding) to communicate with the friction brake control unit to increase the amount of friction brake application, in dependence at least in part upon the force that is determined, to bring the vehicle to a stop and hold the vehicle stopped on the grade. The drive system control unit is further configured to determine a torque level needed to move the vehicle from stop to up the grade. The drive system control unit, responsive to a second input at the operator control for the vehicle to move up the grade, is further configured to: communicate with the friction brake control unit to remove the friction brake application; and concurrently control the electric drive system to provide the electric motive power according to the torque level that is determined, for the vehicle to move from stop to up the inclined grade without substantial vehicle rollback.

In other embodiments, alternatively or additionally, the control system 16 is configured for the drive system control unit 116 to determine a functionality of the second friction brake unit 118, for a friction brake application to the second set of wheels 14, independent of operation of the first friction brake unit 120. For example, the second friction brake unit may be controlled to apply friction brakes to the second set of wheels, without the first friction brake unit being controlled to apply friction brakes to the first set of wheels (i.e., no friction brakes are applied to the first set of wheels). The drive system control unit 116 is configured to control at least one vehicle system based on the determined functionality of the second friction brake unit. For example, if the second friction brake unit is deemed fully functional, the second friction brake unit and the electric drive system 100 may be controlled for a blended braking operation (e.g., of electric retarding braking of the vehicle's rear wheels, concurrent friction braking of the front wheels, and no friction braking of the rear wheels). If the second friction brake unit is determined to be nonfunctional or partially functional (i.e., greater than nonfunctional but less than fully functional), the drive system control unit may, for example, control a memory unit to update a vehicle fault log, control the ignition to prevent the vehicle from moving forward, control the I/O system 145 to alert an operator, control a communication system of the vehicle to communicate a signal off-board the vehicle, and/or control the vehicle for movement but in a manner different than if the second friction brake unit was deemed fully functional (e.g., no blended braking, or blended braking only to the extent the second friction brake unit is determined to be functional to contribute to blended braking).

In the control system, the drive system control unit 116 may be configured, for determining the functionality of the second friction brake unit, to automatically control the second friction brake unit to apply at least one designated friction braking force to the second (e.g., front) set of wheels, to control the electric drive system to simultaneously apply at least one designated torque to the first (e.g., rear) set of wheels, and to monitor any resulting movement of the vehicle. For example, the designated friction braking force may be a full application of the second friction brake unit, and the designated torque may be a maximum torque level the second friction brake unit is designed/configured to accommodate, if fully functional, for preventing vehicle movement. Here, in this example, if there is no vehicle movement at the maximum torque level, the drive system control unit determines that the second friction brake unit is fully functional. However, if there is resulting vehicle movement, the second friction brake unit may be determined to be nonfunctional, or the drive system control unit may proceed by determining a degree of functionality. For example, the drive system control unit may automatically control the second friction brake unit to apply the full application of the second friction brake unit (e.g., continue to apply the full application), and then control the electric drive system to sequentially apply lower levels of torque (e.g., the maximum torque level, and then a torque level that is less than the maximum level by a factor 'x,' then a torque level that is less than the maximum level by '2x,' and so on, i.e., a linear stepped reduction) until there is no vehicle movement. At this point, the torque level which the second friction brake unit is able to accommodate without vehicle movement provides a measure of the degree to which the second friction brake unit is functional to prevent vehicle movement (and thereby functional to contribute to blended braking).

In other aspects, the designated torque level (applied to the first set of wheels) may be the minimum torque required to cause vehicle movement notwithstanding the full application of the second friction brake unit. Here, concurrent with a full application of the second friction brake unit, the drive system control unit 116 may be configured to control the electric drive system to sequentially apply increasingly greater levels of torque to the first set of wheels (i.e., a linear stepped increase) until vehicle movement occurs. The level at which vehicle movement occurs is indicative of the minimum torque required to cause vehicle movement notwithstanding the full application of the second friction brake unit. Specifically, if the drive system control unit is configured to apply increasingly greater levels of torque as a step function 'x' (i.e., each torque increase is by a constant designated value 'x'), the torque level at which vehicle movement occurs will be within a range 'x' (of the constant designated value of torque increase) of the minimum torque required to cause vehicle movement.

In another embodiment, the drive system control unit is configured to automatically control the second friction brake unit to sequentially apply plural different friction braking forces, and to control the electric drive system to respectively apply plural different torques simultaneously with the friction braking forces. That is, concurrent with each of the sequentially applied different friction braking forces, a different torque is applied. The different friction braking forces and torque levels may be linear, such that resulting vehicle movement (or lack thereof) is indicative of whether the second friction brake unit is operating linearly. The friction braking forces and torque levels may be aligned in terms of magnitude, e.g., each torque level is the maximum torque level the second friction brake unit is configured to accommodate at the given friction brake force to prevent vehicle movement.

According to an aspect of the invention, the drive system control unit may be configured to automatically control the second friction brake unit to apply the at least one designated friction braking force to the second (e.g., front) set of wheels (for determining functionality) without any application of the electric retarding to the first (e.g., rear) set of wheels and without any application of friction braking by the first friction brake unit to the first (e.g., rear) set of wheels. Thus, verification of the second friction brake unit is independent of operation of the first friction brake unit, independent of operator operation of a brake pedal, and independent of (although possibly complementary to) any vehicle system tests where all (or at least front and rear) friction brakes of the vehicle are assessed simultaneously.

As mentioned, the drive system control unit is configured to control one or more vehicle systems based on the determined functionality of the second friction brake unit. In addition to what else is described herein, this may include the drive system control unit controlling the friction brake system and the electric drive system for a blended braking application of the electric retarding applied to the first (e.g., rear) set of wheels and the friction brake application to the front set of wheels during movement of the vehicle on an inclined grade, without any application of friction braking by the first friction brake unit to the first (e.g., rear) set of wheels. For example, if the second friction brake unit is determined to be fully functional, the blended braking application may be carried out according to the full application of the second friction brake unit, as normal. If the second friction brake unit is determined to be nonfunctional, the blended braking may be discontinued during vehicle operation (i.e., no blended braking). If the second friction brake unit is determined to be partially functional, the blended braking may be discontinued, or applied only to the extent the second friction braking unit is functional.

In embodiments, the control is configured to verify the functionality of the front friction brakes of the vehicle 10 before commencing operation of the vehicle. Existing systems validate the complete, four-wheel brake system. As a result, it is possible that the rear brakes could be providing enough holding/stopping force to pass the test with weak front friction brakes. Accordingly, in slippery conditions, when the front friction brakes are needed to control the vehicle, the required braking force provided by the front brakes might not be available, or the pressure to force calibration could be off. This would degrade the ability of the control system to integrate the friction and electric retarder brakes, thus negatively impacting driveability and productivity.

In embodiments of the control system, in addition to a complete 4-wheel brake validation process, the drive system control unit 116, in conjunction with the friction braking system control unit 127, is configured to also verify the functionality of, solely, the front friction brake unit 118.

In connection with the above, embodiments of the control system may integrate the front brake control of the blended braking system with the existing drive system automatic brake validation system. In particular, as an additional step in a brake validation sequence that may be carried out for a vehicle, the drive system control unit 116 may be configured to communicate with the friction brake control unit 127 to command the front friction brake unit 118 to apply a designated friction braking force to the front wheels 14, then apply an appropriate torque to the rear wheels 12 to validate that the front friction brake unit 118 is capable of holding the vehicle 10. In an embodiment, the control system can validate several points, if necessary, to prove linearity. In an embodiment, the control system can validate several points to prove absolute capability.

In an embodiment, adding drive system control of the front brakes for blended braking creates a separate brake system (front only with drive system activation) which is independently validated during a pre-vehicle operation (e.g., pre-shift) brake test. This is in contrast to existing brake validation systems that only check the complete front and rear brakes as commanded by the foot pedal.

Embodiments of the invention are applicable, as noted above, to relatively large vehicles, for example, haul trucks and other vehicles having a gross vehicle operating weight of at least 250 metric tons. However, while embodiments of the present invention have been described with specific reference to OHV's and other large vehicles of this type, the present invention is not intended to be so limited in this regard. In particular, it is contemplated that embodiments of the invention are equally applicable to electric vehicles generally, including but not limited to, electric off-highway vehicles, automobiles, and the like.

As noted above, the vehicle operator may be a person or an autonomous controller. Thus, "operator control" includes both controls that are operably by a human, and controls (e.g., control signals/inputs) associated with a control system/autonomous controller.

In an embodiment, a control system (e.g., braking control system) for a vehicle includes an electric drive system, a drive system control unit, and a friction brake system. The electric drive system is associated with a first set of wheels (e.g., rear wheels) of the vehicle. The drive system control unit is configured to control the electric drive system to selectively provide electric motive power to the first set of wheels to propel the vehicle and electric retarding to slow the vehicle. The friction brake system includes a first friction brake unit associated with the first set of wheels and a second friction brake unit associated with a second set of wheels (e.g., front wheels) of the vehicle. The drive system control unit is further configured to determine a functionality of the second friction brake unit, for a friction brake application to the second set of wheels, independent of operation of the first friction brake unit, and to control at least one vehicle system based on the determined functionality of the second friction brake unit.

In another embodiment, a control system (e.g., braking control system) for a vehicle includes an electric drive system, a drive system control unit, and a friction brake system. The electric drive system is associated with a first set of wheels (e.g., rear wheels) of the vehicle. The drive system control unit is configured to control the electric drive system to selectively provide electric motive power to the first set of wheels to propel the vehicle and electric retarding to slow the vehicle. The friction brake system includes a first friction brake unit associated with the first set of wheels and a second friction brake unit associated with a second set of wheels (e.g., front wheels) of the vehicle. The drive system control unit is further configured to determine a functionality of the second friction brake unit, for a friction brake application to the second set of wheels, independent of operation of the first friction brake unit, and to control at least one vehicle system based on the determined functionality of the second friction brake unit. The drive system control unit is configured, for determining the functionality of the second friction brake unit, to automatically control the second friction brake unit to apply at least one designated friction braking force to the front set of wheels, to control the electric drive system to simultaneously apply at least one designated torque to the rear set of wheels, and to monitor any resulting movement of the vehicle.

In another embodiment, a control system (e.g., braking control system) for a vehicle includes an electric drive system, a drive system control unit, and a friction brake system. The electric drive system is associated with a first set of wheels (e.g., rear wheels) of the vehicle. The drive system control unit is configured to control the electric drive system to selectively provide electric motive power to the first set of wheels to propel the vehicle and electric retarding to slow the vehicle. The friction brake system includes a first friction brake unit associated with the first set of wheels and a second friction brake unit associated with a second set of wheels (e.g., front wheels) of the vehicle. The drive system control unit is further configured to determine a functionality of the second friction brake unit, for a friction brake application to the second set of wheels, independent of operation of the first friction brake unit, and to control at least one vehicle system based on the determined functionality of the second friction brake unit. The at least one designated friction braking force is a full application of the second friction brake unit, and the at least one designated torque is a minimal torque required to cause the resulting movement notwithstanding the full application of the second friction brake unit.

In another embodiment, a control system (e.g., braking control system) for a vehicle includes an electric drive system, a drive system control unit, and a friction brake system. The electric drive system is associated with a first set of wheels (e.g., rear wheels) of the vehicle. The drive system control unit is configured to control the electric drive system to selectively provide electric motive power to the first set of wheels to propel the vehicle and electric retarding to slow the vehicle. The friction brake system includes a first friction brake unit associated with the first set of wheels and a second friction brake unit associated with a second set of wheels (e.g., front wheels) of the vehicle. The drive system control unit is further configured to determine a functionality of the second friction brake unit, for a friction brake application to the second set of wheels, independent of operation of the first friction brake unit, and to control at least one vehicle system based on the determined functionality of the second friction brake unit. The at least one designated friction braking force comprises plural different sequentially applied friction braking forces, and the at least one designated torque comprises plural different torques each applied simultaneously with a respective one of the friction braking forces. The plural different sequentially applied friction braking forces and the plural different torques may be linear.

In another embodiment, a control system (e.g., braking control system) for a vehicle includes an electric drive system, a drive system control unit, and a friction brake system. The electric drive system is associated with a first set of wheels (e.g., rear wheels) of the vehicle. The drive system control unit is configured to control the electric drive system to selectively provide electric motive power to the first set of wheels to propel the vehicle and electric retarding to slow the vehicle. The friction brake system includes a first friction brake unit associated with the first set of wheels and a second friction brake unit associated with a second set of wheels (e.g., front wheels) of the vehicle. The drive system control unit is further configured to determine a functionality of the second friction brake unit, for a friction brake application to the second set of wheels, independent of operation of the first friction brake unit, and to control at least one vehicle system based on the determined functionality of the second friction brake unit. The drive system control unit is configured to automatically control the second friction brake unit to apply the at least one designated friction braking force to the front set of wheels without any application of the electric retarding to the rear set of wheels and without any application of friction braking by the first friction brake unit to the rear set of wheels. The at least one vehicle system that the drive system control unit is configured to control based on the determined functionality of the second friction brake unit comprises the friction brake system and the electric drive system, for a blended braking application of the electric retarding applied to the rear set of wheels (e.g., electric retarding is applied only to the rear wheels) and the friction brake application to the front set of wheels (e.g., friction brakes are applied only to the front wheels) during movement of the vehicle on an inclined grade, without any application of friction braking by the first friction brake unit to the rear set of wheels.

In another embodiment, a control system (e.g., braking control system) for a vehicle includes an electric drive system, a drive system control unit, and a friction brake system. The electric drive system is associated with a first set of wheels (e.g., rear wheels) of the vehicle. The drive system control unit is configured to control the electric drive system to selectively provide electric motive power to the first set of wheels to propel the vehicle and electric retarding to slow the vehicle. The friction brake system includes a first friction brake unit associated with the first set of wheels and a second friction brake unit associated with a second set of wheels (e.g., front wheels) of the vehicle. The drive system control unit is further configured to determine a functionality of the second friction brake unit, for a friction brake application to the second set of wheels, independent of operation of the first friction brake unit, and to control at least one vehicle system based on the determined functionality of the second friction brake unit. The at least one vehicle system that the drive system control unit is configured to control based on the functionality of the second friction brake unit that is determined comprises the friction brake system and the electric drive system, for a blended braking application of the electric retarding applied to the rear set of wheels and the friction brake application to the front set of wheels during movement of the vehicle on an inclined grade, without any application of friction braking by the first friction brake unit to the rear set of wheels.

In another embodiment, a method includes controlling, with a drive system control unit, an electric drive system of a vehicle to selectively provide electric motive power to a first set of wheels of the vehicle (e.g., rear wheels) to propel the vehicle and electric retarding to slow the vehicle. The method further includes determining, with the drive system control unit, a functionality of a second friction brake unit of the vehicle, for a friction brake application to a second set of wheels of the vehicle (e.g., front wheels), independent of operation of a first friction brake unit of the vehicle. (The vehicle has a friction brake system that includes the first friction brake unit associated with the first set of wheels and the second friction brake unit associated with the second set of wheels.) The method further includes controlling at least one vehicle system based on the determined functionality of the second friction brake unit. The first set of wheels may comprise a rear set of wheels of the vehicle and the second set of wheels may comprise a front set of wheels of the vehicle.

In another embodiment of the method, the step of determining the functionality of the second friction brake unit includes automatically controlling the second friction brake unit to apply at least one designated friction braking force to the front set of wheels, controlling the electric drive system to simultaneously apply at least one designated torque to the rear set of wheels, and monitoring any resulting movement of the vehicle. In one aspect, the designated friction braking force is a full application of the second friction brake unit, and the torque includes plural different torque levels sequentially applied until vehicle movement stops or starts, as applicable. In another aspect, plural different friction braking forces are sequentially applied, and plural different torques are respectively applied simultaneously with the friction braking forces. The different friction braking forces and torques may be linear.

In another embodiment of the method, the second friction brake unit is automatically controlled to apply the at least one designated friction braking force to the front set of wheels without any application of the electric retarding to the rear set of wheels and without any application of friction braking by the first friction brake unit to the rear set of wheels.

In another embodiment of the method, controlling the at least one vehicle system based on the determined functionality of the second friction brake unit includes controlling the friction brake system and the electric drive system for a blended braking application of the electric retarding applied to the rear set of wheels and the friction brake application to the front set of wheels during movement of the vehicle on an inclined grade, without any application of friction braking by the first friction brake unit to the rear set of wheels.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the embodiments of the invention without departing from its scope. While the dimensions and types of materials described herein are intended to define the parameters of the embodiments of the invention, they are by no means limiting and are exemplary embodiments. Many other embodiments will be apparent to those of skill in the art upon reviewing the above description. The scope of the embodiments of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the invention, including the best mode, and also to enable one of ordinary skill in the art to practice the embodiments of invention, including making and using any devices or systems and performing any incorporated methods. The patentable scope of the embodiments of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the embodiments described herein, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A control system, comprising:
   an electric drive system associated with a rear set of wheels of a vehicle;
   one or more processors configured to control the electric drive system to selectively provide electric motive power to the rear set of wheels to propel the vehicle and electric retarding to slow the vehicle; and
   a friction brake system having a first friction brake unit associated with the rear set of wheels and a second friction brake unit associated with a front set of wheels of the vehicle;
   wherein the one or more processors are further configured to determine a functionality of the second friction brake unit, for a friction brake application to the front set of wheels, independent of operation of the first friction brake unit, and to control at least one vehicle system based on the functionality of the second friction brake unit that is determined; and wherein the one or more processors are configured, for determining the functionality of the second friction brake unit, to automatically control the second friction brake unit to apply at least one designated friction braking force to the front set of wheels, to control the electric drive system to simultaneously apply at least one designated torque to the rear set of wheels, and to monitor any resulting movement of the vehicle.

2. The control system of claim 1, wherein the at least one designated friction braking force is a full application of the second friction brake unit, and the at least one designated torque is a minimal torque required to cause the resulting movement notwithstanding the full application of the second friction brake unit.

3. The control system of claim 1, wherein the at least one designated friction braking force comprises plural different sequentially applied friction braking forces, and the at least one designated torque comprises plural different torques each applied simultaneously with a respective one of the friction braking forces.

4. The control system of claim 3, wherein the plural different sequentially applied friction braking forces and the plural different torques are linear.

5. The control system of claim 1, wherein the one or more processors are configured to automatically control the second friction brake unit to apply the at least one designated friction braking force to the front set of wheels without any application of the electric retarding to the rear set of wheels and without any application of friction braking by the first friction brake unit to the rear set of wheels.

6. The control system of claim 5, wherein a gross vehicle operating weight of the vehicle is at least 250 metric tons.

7. The control system of claim 5, wherein the at least one vehicle system that the one or more processors are configured to control based on the functionality of the second friction brake unit that is determined comprises the friction brake system and the electric drive system, for a blended braking application of the electric retarding applied to the rear set of wheels and the friction brake application to the front set of wheels during movement of the vehicle on an inclined grade, without any application of friction braking by the first friction brake unit to the rear set of wheels.

8. A control system, comprising:
an electric drive system associated with a rear set of wheels of a vehicle;
one or more processors configured to control the electric drive system to selectively provide electric motive power to the rear set of wheels to propel the vehicle and electric retarding to slow the vehicle; and
a friction brake system having a first friction brake unit associated with the rear set of wheels and a second friction brake unit associated with a front set of wheels of the vehicle;
wherein the one or more processors are further configured to determine a functionality of the second friction brake unit, for a friction brake application to the front set of wheels, independent of operation of the first friction brake unit, and to control at least one vehicle system based on the functionality of the second friction brake unit that is determined; and
wherein a gross vehicle operating weight of the vehicle is at least 250 metric tons.

9. The control system of claim 8, wherein the at least one vehicle system that the one or more processors are configured to control based on the functionality of the second friction brake unit that is determined comprises the friction brake system and the electric drive system, for a blended braking application of the electric retarding applied to the rear set of wheels and the friction brake application to the front set of wheels during movement of the vehicle on an inclined grade, without any application of friction braking by the first friction brake unit to the rear set of wheels.

10. A control system, comprising:
an electric drive system associated with a first set of wheels of a vehicle;
one or more processors configured to control the electric drive system to selectively provide electric motive power to the first set of wheels to propel the vehicle and electric retarding to slow the vehicle; and
a friction brake system having a first friction brake unit associated with the first set of wheels and a second friction brake unit associated with a second set of wheels of the vehicle;
wherein the one or more processors are further configured to determine a functionality of the second friction brake unit, for a friction brake application to the second set of wheels, independent of operation of the first friction brake unit, and to control at least one vehicle system based on the functionality of the second friction brake unit that is determined; and
wherein the at least one vehicle system that the one or more processors are configured to control based on the functionality of the second friction brake unit that is determined comprises the friction brake system and the electric drive system, for a blended braking application of the electric retarding applied to the first set of wheels and the friction brake application to the second set of wheels during movement of the vehicle on an inclined grade, without any application of friction braking by the first friction brake unit to the first set of wheels.

11. A method, comprising:
controlling, with one or more processors, an electric drive system of a vehicle to selectively provide electric motive power to a first set of wheels of the vehicle to propel the vehicle and electric retarding to slow the vehicle;
determining, with the one or more processors, a functionality of a second friction brake unit of the vehicle, for a friction brake application to a second set of wheels of the vehicle, independent of operation of a first friction brake unit of the vehicle, the vehicle having a friction brake system with the first friction brake unit associated with the first set of wheels and the second friction brake unit associated with the second set of wheels; and
controlling at least one vehicle system based on the functionality of the second friction brake unit that is determined;
wherein the first set of wheels comprises a rear set of wheels of the vehicle and the second set of wheels comprises a front set of wheels of the vehicle; and
wherein determining the functionality of the second friction brake unit comprises automatically controlling the second friction brake unit to apply at least one designated friction braking force to the front set of wheels, controlling the electric drive system to simultaneously apply at least one designated torque to the rear set of wheels, and monitoring any resulting movement of the vehicle.

12. The method of claim 11, wherein the at least one designated friction braking force comprises plural different sequentially applied friction braking forces, and the at least one designated torque comprises plural different torques each applied simultaneously with a respective one of the friction braking forces.

13. The method of claim 12, wherein the plural different sequentially applied friction braking forces and the plural different torques are linear.

14. The method of claim 11, wherein the second friction brake unit is automatically controlled to apply the at least one designated friction braking force to the front set of wheels without any application of the electric retarding to the rear set of wheels and without any application of friction braking by the first friction brake unit to the rear set of wheels.

15. The method of claim 14, wherein controlling the at least one vehicle system based on the functionality of the second friction brake unit that is determined comprises controlling the friction brake system and the electric drive system for a blended braking application of the electric retarding applied to the rear set of wheels and the friction brake application to the front set of wheels during movement of the vehicle on an inclined grade, without any application of friction braking by the first friction brake unit to the rear set of wheels.

16. A method, comprising:
controlling, with one or more processors, an electric drive system of a vehicle to selectively provide electric motive power to a first set of wheels of the vehicle to propel the vehicle and electric retarding to slow the vehicle;
determining, with the one or more processors, a functionality of a second friction brake unit of the vehicle, for a friction brake application to a second set of wheels of the vehicle, independent of operation of a first friction brake unit of the vehicle, the vehicle having a friction brake system with the first friction brake unit associated with the first set of wheels and the second friction brake unit associated with the second set of wheels; and
controlling at least one vehicle system based on the functionality of the second friction brake unit that is determined;
wherein a gross vehicle operating weight of the vehicle is at least 250 metric tons.

17. A control system, comprising:
an electric drive system associated with a first set of wheels of a vehicle;
one or more processors configured to control the electric drive system to selectively provide electric motive power to the first set of wheels to propel the vehicle and electric retarding to slow the vehicle; and
a friction brake system having a first friction brake unit associated with the first set of wheels and a second friction brake unit associated with a second set of wheels of the vehicle;
wherein the one or more processors are further configured to determine a functionality of the second friction brake unit, independent of operation of the first friction brake unit, and to control at least one vehicle system based on the functionality of the second friction brake unit that is determined; and
wherein the one or more processors are configured to determine the functionality by verifying, before at least one of commencing driving operation of the vehicle or a friction brake application to the second set of wheels during driving operation of the vehicle, that the second friction brake unit will be available for the friction brake application to the second set of wheels.

18. The system of claim 17, wherein a gross vehicle operating weight of the vehicle is at least 250 metric tons.

* * * * *